United States Patent
Parkvall et al.

(10) Patent No.: US 8,345,654 B2
(45) Date of Patent: Jan. 1, 2013

(54) METHOD FOR REDUCING INTRA-CELL INTERFERENCE BETWEEN CELL PHONES PERFORMING RANDOM ACCESS

(75) Inventors: Stefan Parkvall, Stockholm (SE); Jacobus Cornelis Haartsen, Hardenberg (NL); Robert Baldemair, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 708 days.

(21) Appl. No.: 12/444,056

(22) PCT Filed: Jun. 26, 2007

(86) PCT No.: PCT/SE2007/050467
§ 371 (c)(1),
(2), (4) Date: Nov. 24, 2009

(87) PCT Pub. No.: WO2008/041916
PCT Pub. Date: Apr. 10, 2008

(65) Prior Publication Data
US 2010/0069084 A1    Mar. 18, 2010

(30) Foreign Application Priority Data
Oct. 2, 2006    (SE) ...................................... 0602077

(51) Int. Cl.
*H04B 7/216*    (2006.01)
(52) U.S. Cl. ...................................................... 370/342
(58) Field of Classification Search ................... 370/342, 370/335
See application file for complete search history.

(56) References Cited

U.S. PATENT DOCUMENTS

| 7,496,113 | B2 * | 2/2009 | Cai et al. ........................ 370/474 |
| 2003/0067899 | A9 * | 4/2003 | Chen et al. ..................... 370/335 |
| 2003/0086366 | A1 * | 5/2003 | Branlund et al. ............. 370/208 |
| 2003/0123425 | A1 * | 7/2003 | Walton et al. ................. 370/341 |
| 2004/0264550 | A1 * | 12/2004 | Dabak ............................ 375/142 |
| 2005/0111522 | A1 * | 5/2005 | Sung et al. ..................... 375/145 |
| 2005/0117549 | A1 * | 6/2005 | Kanterakis et al. ........... 370/335 |
| 2005/0215251 | A1 * | 9/2005 | Krishnan et al. .............. 455/434 |
| 2005/0254467 | A1 * | 11/2005 | Li et al. ......................... 370/335 |
| 2007/0047483 | A1 * | 3/2007 | Khan .............................. 370/328 |
| 2008/0285534 | A1 * | 11/2008 | Dent .............................. 370/342 |

FOREIGN PATENT DOCUMENTS

| WO | WO 2004030392 A1 | 4/2004 |
| WO | WO 2007052971 A1 | 5/2007 |

* cited by examiner

*Primary Examiner* — Fan Ng

(57) ABSTRACT

A method in a network node in control of a cell in a cellular telecommunication network for reducing intra-cell interference between user equipments (UE) residing in said cell and performing random access (RA). The method comprises the steps of arranging groups of preamble sequences where the sequences within each group are orthogonal to each other, assigning one such group to the cell, from which group the UEs performing RA randomly selects a preamble, and assigning one or more additional group(s) of preamble sequences to said cell if the RACH or traffic load exceeds a certain threshold. The invention further relates to a radio network node in a cellular telecommunication system, capable of carrying out said method.

15 Claims, 3 Drawing Sheets

METHOD FOR REDUCING INTRA-CELL INTERFERENCE BETWEEN CELL PHONES PERFORMING RANDOM ACCESS

FIELD OF THE INVENTION

The present invention relates to methods and arrangements in cellular mobile communication systems for reducing intra-cell interference between user equipments performing random access.

BACKGROUND

In modern cellular radio systems, the radio network has a strict control on the behavior of the terminal. Uplink transmission parameters like frequency, timing, and power are regulated via downlink control signaling from the base station to the terminal.

At power-on or after a long standby time, the User Equipment (UE) is not synchronized in the uplink. An uplink frequency and power estimate the UE can derive from the downlink (control) signals. However, a timing estimate is difficult to make since the round-trip propagation delay between the base station (Node B) and the UE is unknown. So even if UE uplink timing is synchronized to the downlink, it may arrive too late at the Node B receiver because of the propagation delays. Therefore, before commencing traffic, the UE has to carry out a Random Access (RA) procedure to the network. After the RA, Node B can estimate the timing misalignment of the UE uplink and send a correction message. During the RA, uplink parameters like timing and power are not very accurate. This poses extra challenges to the dimensioning of a RA procedure.

Usually, a Random Access Channel (RACH) is provided for the UE to request access to the network. An Access Burst (AB) is used which contains a preamble with a specific sequence with good Auto-Correlation (AC) properties. The RACH can be orthogonal to the Traffic Channels (TCH). For example, in GSM a special RACH slot is defined. Because multiple UEs can request access at the same time, collisions may occur between requesting UEs. A contention resolution scheme has to be implemented to separate the UE transmissions. The RA scheme usually includes a random back off mechanism. The timing uncertainty is accounted for by extra guard time in the RACH slot. The power uncertainty is usually less of a problem as the RACH is orthogonal to the TCHs.

In WCDMA, the RACH is shared with the uplink TCHs. The uplink channels are not orthogonal. In addition to interference from other requesting UEs, the UE experiences interference from uplink TCHs and vice versa. The processing gain provided by the Direct-Sequence spreading will have to cope with the mutual interference. In WCDMA, the transmit power is a shared radio resource. In order to avoid near-far problems, the power received at Node B has to be approximately equal for each UE. A strict uplink power control is required. To prevent an AB to saturate the Node B receiver, the UE starts with a relatively low transmit power. If no access grant follows, it retransmits the AB at a slightly higher power level. It continues to increase the AB power until a grant is received.

To distinguish between different UEs performing RA typically many different preambles exist. A UE performing RA randomly picks a preamble out of a pool and transmits it. The preamble represents a random UE ID which can be used by the Node B when granting the UE access to the network. The Node B receiver can resolve RA attempts performed with different preambles and send a response message to each UE using the corresponding random UE IDs. In case that multiple UEs simultaneously use the same preamble a collision occurs and most likely the RA attempts are not successful since the Node B cannot distinguish between the two users with a different random UE ID.

To minimize the probability of collision the set of available sequences should be large.

Preambles assigned to adjacent cells are typically different to ensure that a RA in one cell does not trigger any RA events in a neighboring cell.

As already stated before, the preamble shall possess good AC properties to guarantee a good detection (e.g. good timing resolution). To be able to reliably distinguish RA attempts performed with different preambles, good cross-correlation properties are important. In the ideal case, the preambles are orthogonal to each other (orthogonal means vanishing cross-correlation function over at least the time interval of possible roundtrip propagation delays). Many different preambles are desirable to lower the collision probability. However, the number of orthogonal preamble sequences is rather low. Therefore the two requirements—"many" and "orthogonal"—contradict each other.

The number of available orthogonal sequences is typically too low to fulfill the required collision probability—at least for the worst case assumptions on the RACH load. Therefore the sequences assigned to a cell are typically extended with non-orthogonal sequences. Since these additional preambles are not orthogonal, intra-cell interference occurs.

In case of high RACH loads this is unavoidable since additional sequences are required to lower the collision probability. However, for low RACH loads these additional sequences would not be necessary since the collision probability is anyway low—adding additional sequences only generates intra-cell interference.

SUMMARY

The problem experienced with previously known methods is thus that the number of preamble sequences that is required for keeping the collision risk on an acceptable level at high RACH load causes unnecessary intra-cell interference at low RACH load. It is therefore an object of the present invention to provide a method where the available random access resources are used more efficiently. The present invention relates to a method for reducing intra-cell interference between user equipments [UE] performing random access. More specifically, the invention relates to a method in a network node in control of a cell in a cellular telecommunication network for reducing intra-cell interference between user equipments (UE) (10) residing in said cell and performing random access (RA). The method comprises the steps of arranging groups of preamble sequences where the sequences within each group are orthogonal to each other, assigning one such group to the cell, from which group the UEs performing RA randomly selects a preamble, and assigning one or more additional group(s) of preamble sequences to said cell if the RACH or traffic load exceeds a certain threshold.

Thus, according to the invention, the amount of assigned RA resources (sequence groups) depends on the RACH load or the normal user traffic load in the cell. With regard to the inventive concept, it is equivalent if the RACH load or the traffic load is used for determining the condition of the cell in order to carry out the invention, since low traffic load normally also means low RACH load and vice versa. In case of low RACH/traffic loads only one sequence group is assigned thus totally avoiding intra-cell interference. With increasing RACH load—and thus also increasing collision probability—additional sequence groups are assigned to the cell whereby the risk for collisions is reduced while the intra-cell interference increases. Since a collision has a much more serious effect on the system performance than interference has, reduced collision probability is traded against increased intra-cell interference.

According to a specific embodiment of the invention, the number of preamble sequence groups assigned to a cell is depending on a parameter representing anticipated RACH or traffic load.

Alternatively, the number of preamble sequence groups assigned to a cell is depending on a dynamically changing parameter representing an instantaneous condition in the cell. Such dynamically changing parameter could e.g. represent the instantaneous value of the normal user traffic load or the RACH in the cell.

In order to determine said dynamically changing parameter, measurements can be performed for normal user traffic, RACH transmissions and/or number of RACH collisions which are all known in the base station. The instantaneous value may be estimated using an average of the measured user traffic load or RACH load over a short time period in the near past.

The assignment of resources (sequence group or groups) to the cell is preferably made on the broadcast channel. Alternatively, the available sequence group or groups in the cell may be communicated from the network node directly to a UE, for example at handover situations.

Furthermore, certain RA detection parameters in the base station can be altered depending on the amount of assigned RA resources, which increases the performance of the network. For example, when only one preamble sequence group is assigned to a cell, the detection threshold can be low, whereas a higher detection threshold is required when one or more preamble sequence group(s) is added to the cell.

Furthermore, with the invention, the base station complexity is reduced, since the number of sequences the base station has to test against also scales with the number of assigned sequence groups.

The invention furthermore relates to a radio network node in a cellular telecommunication system comprising
- means for arranging groups of preamble sequences where the sequences within each group are orthogonal to each other;
- means for assigning one or more such groups to the cell that the radio network node is in control of; and
- means for receiving a load estimation input and for making a decision on assignment of one or more additional group(s) to the cell based on said input.

Said node can be a radio base station.

BRIEF DESCRIPTION OF THE DRAWINGS

The foregoing and other objects, features and advantages of the invention will be apparent from the following detailed description of preferred embodiments as illustrated in the drawings.

DESCRIPTION

Figure 1:
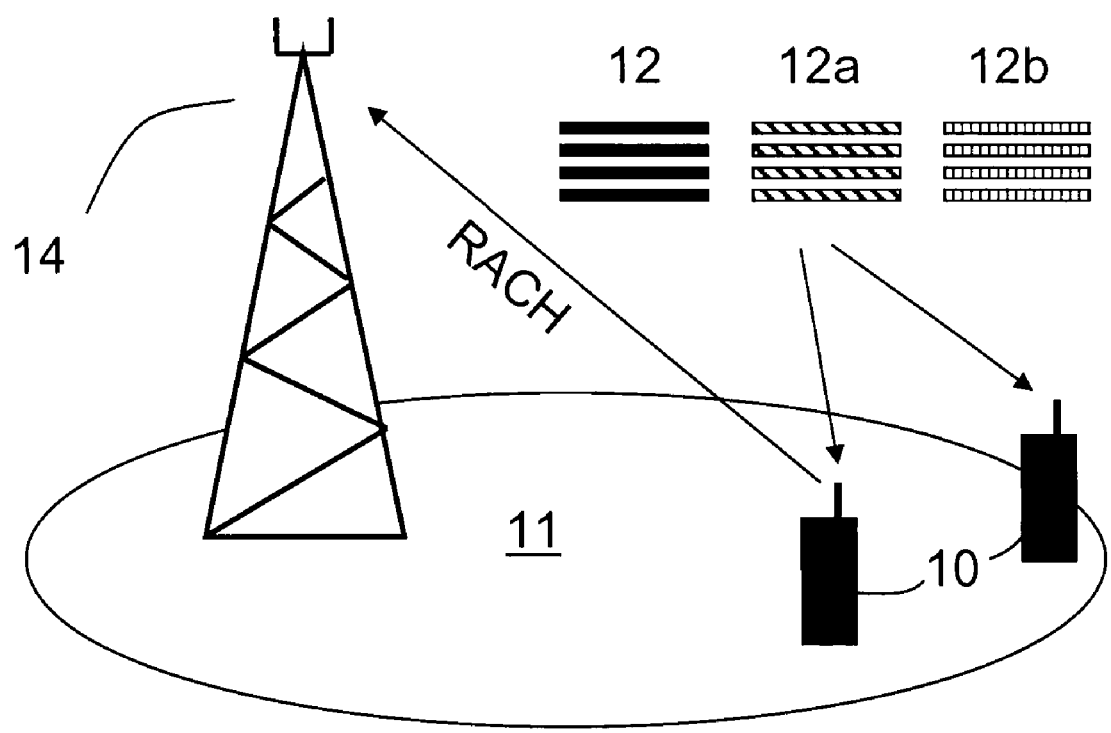
FIG. 1 illustrates an embodiment of the method according to the invention.

FIG. 1 illustrates schematically a network node 14, in the following referred to as a base station, said base station is in control of a cell 11 of a cellular communication network and UEs 10 residing in said cell. Before commencing traffic, the UE has to carry out a Random Access (RA) procedure to the network, whereby an Access Burst containing a preamble with a specific sequence with good Auto-Correlation (AC) properties is used. Depending on the sequence family used to construct the preambles, it is often only possible to design small groups 12, 12a, 12b of preambles where the sequences contained within one group in accordance with the invention are orthogonal to each other. Sequences contained in one group are not orthogonal to the sequences in other groups. A sequence family is a mathematical grouping of sequences. In LTE Zadoff-Chu sequences are used, while other technologies may use another family or class, e.g. Walsh-Hadamard sequences.

Figure 2:
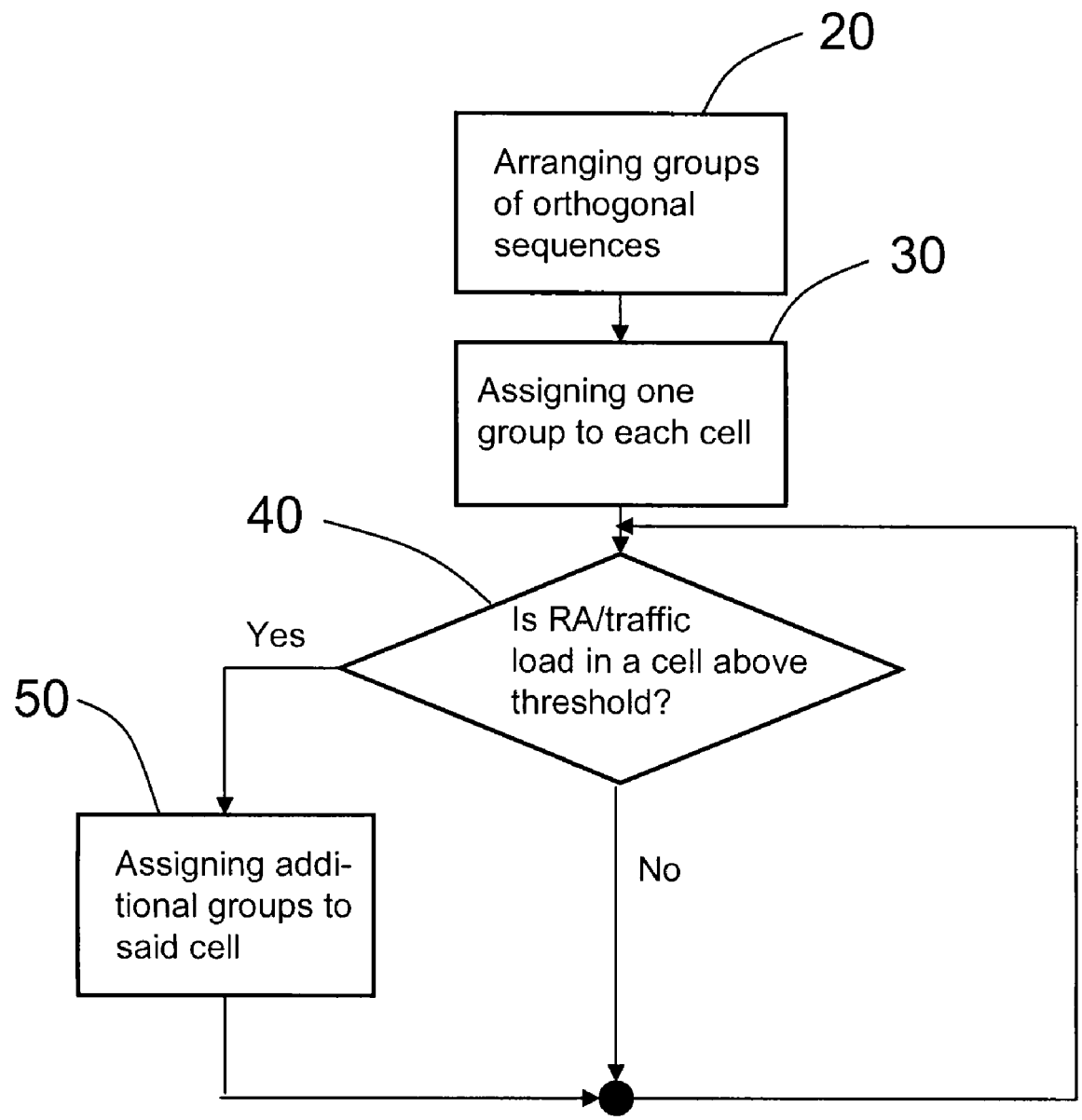
FIG. 2 shows a flowchart illustrating the method according to the invention

FIG. 2 shows a flow chart illustrating the method according to the invention. In step 20, a base station in control of a cell is given a number of available preamble groups that can be assigned to the cell that the base station is in control of. The preambles within each group are orthogonal to each other. Each base station has different groups at its disposal. In step 30, one such group 12 of orthogonal preambles is assigned to the cell. Since the preamble sequences within each group are orthogonal to each other, intra-cell interference created by RA transmissions is avoided. The assignment is preferably done by the base station 14, such as a Node B or eNodeB. Which group is assigned to which cell is typically announced by the radio base station 14 on the broadcast channel. UEs 10 within the particular cell 11 may now select randomly a RA preamble of the assigned group 12 and transmit it. As long as only one preamble group is assigned to the cell, all preambles assigned to this cell are mutually orthogonal, whereby different RA attempts do not interfere with each other (assuming that different preambles were picked by the UE).

This scheme works fine if the expected RACH/traffic load is below a predefined threshold such that the cell can be satisfied with the (rather small) number of orthogonal sequences in a single group that is assigned to the cell. In such case, no additional activity is activated and method step 40 is repeated.

For cells with an intense RACH load the number of orthogonal sequences in one assigned group is typically too low and many collisions occur. Therefore, when the RACH or traffic load in the cell has reached a certain threshold, see step 40 in FIG. 2, it will be necessary to increase the number of sequences available for selection by the UEs by assigning one or more additional sequence groups (12a, 12b) to the cell, see step 50. Thereafter, step 40 is repeated.

The increase in number of sequences according to step 50 has two consequences:
1. The likelihood that two or more UEs 10 randomly pick the same sequence—and thus also the likelihood of collisions—decreases.
2. Not all preambles assigned to one cell are orthogonal anymore, since only sequences within one group are mutual orthogonal, but sequences belonging to different groups 12, 12a, 12b are not orthogonal. Therefore, intra-cell interference occurs which increases the likelihood of false alarms, i.e. that the base station interprets interference as a RA attempt, or—if the false alarm rate is kept constant—of missed detections, i.e. that the base station misses RA attempts from the UEs.

It is to be understood, that a collision has a much more serious effect on the system performance than a missed detection or false alarm. In case of a collision, the radio base station 14 may still allocate resources for the request. Since two (or more) UEs 10 are using the same random UE ID, they will both interpret the grant as permission to send. This will result in yet more collisions, and a collision resolution scheme may require quite some time to resolve the conflict. In contrast, a missed detection will just delay the RA attempt since the UE 10 will issue a new attempt at a later RACH opportunity. A false alarm will result in a temporary wasted resource allocation (which will not be used).

As previously described, the decision to assign one or multiple groups 12, 12a, 12b of sequences to a cell 11 is traffic dependent such that in case of low RACH loads only one group 12 should be assigned, in case of high RACH loads two or more groups 12, 12a, 12b should be assigned.

The amount of RACH resources (groups of orthogonal sequences) assigned to one specific cell may further depend on the properties of this cell. Typical factors that influence this decision are cell layout, cell type, cell location, anticipated RACH load based for example on statistics such as traffic variations during 24 hours in a specific cell, etc, but also on the instantaneous traffic load within the cell.

The proposed solution can either work in a semi-dynamic or dynamic way:
1. Semi-dynamic: Here the amount of RACH resources assigned to a cell 11 does not depend on the instantaneous RACH load, but instead on statistics based on measurements over a relatively long time period. Typically also static properties of the cell 11 are used to determine the resources, such as cell layout, cell type and cell location. The number of resources (the number of preamble sequence groups assigned to the cell) is not changed as frequent as in the dynamic case described below. Which resources that are assigned to the cell is preferably announced on the broadcast channel.
2. Dynamic: In addition to static properties and/or anticipated RACH load of the cell, also present traffic conditions influence the amount of assigned resources, i.e. the number of preamble sequence groups. Typically the average traffic load over a short time period will be used in order to predict the traffic or RACH load in a very near future. Again, the resources assigned to a cell can preferably be announced on the broadcast channel.

Application of the invention provides the appropriate number of sequences to maintain the desired low collision probability. Since there is no "over-dimensioning" of the provided sequences but a matching to the currently required amount of sequences, the generated intra-cell interference is minimized.

Figure 3:
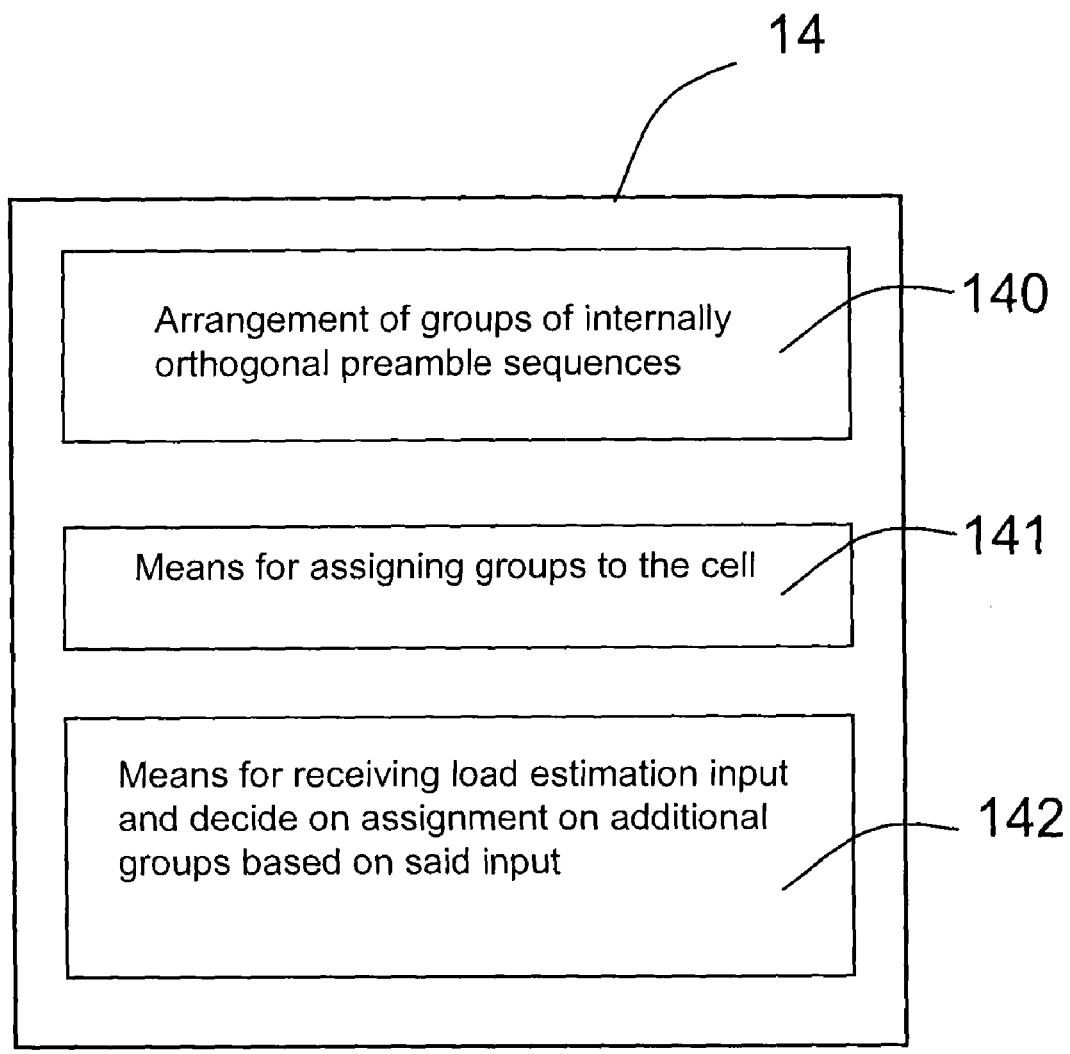
FIG. 3 illustrates schematically a network node according to the invention.

FIG. 3 shows schematically a network node such as a base station according to the invention. For clarity reasons only the features relevant for this invention are included in this figure. In order to carry out the method described in the foregoing, the base station comprises means 140 for arranging groups of preamble sequences where the sequences within each group are orthogonal to each other. It furthermore comprises means 141 for assigning one or more such groups to the cell that the base station is in control of and means 142 for receiving a load estimation input and for making a decision on assignment of one or more additional group(s) to the cell based on said input. The load estimation can be based on measurements on traffic or RACH load as previously described. Such measurements may be carried out in known manners that are obvious to a person skilled in the art, and will preferably be based on information that is available to the base station.

An additional possibility according to the invention to further increase the performance of the network is to alter detection parameters used by the base station for detecting RA attempts depending on the number of assigned sequence groups. For example, in case of only one assigned sequence-group no intra-cell interference exists, the detection threshold can be low. However, as soon as a second group is added, intra-cell interference occurs and a higher threshold is required to maintain the same false alarm probability as before. Another example is that when the number of available sequences increases, also the total (system) false alarm rate increases. If the total false alarm rate should be kept constant, the per-sequence false alarm rate must be decreased, also influencing the threshold.

This invention also reduces base station complexity in that the number of sequences the base station 14 has to test against scales also with the assigned number of sequence groups as described in the following: A typical RACH receiver correlates the received signal with all possible RACH preambles (even though smart processing is possible so that calculations can be reused) and considers RACH preamble(s) to be present if the corresponding correlation value(s) exceeds a threshold value. If the number of preambles assigned to a cell is reduced also the number of required correlations and thus complexity is reduced.

The invention should not be limited to the example described in the foregoing. The scope of protection is defined by the appended claims.

The invention claimed is:

1. A method in a network node in control of a cell in a cellular telecommunication network for reducing intra-cell interference between user equipments (UE) residing in said cell and performing random access (RA) on a Random Access Channel (RACH), comprising the steps of
arranging groups of preamble sequences where the sequences within each group are orthogonal to each other, while sequences belonging to different groups are not orthogonal to each other;
assigning one such group to the cell, from which group the UEs performing RA randomly selects a preamble, and
assigning one or more additional group(s) of preamble sequences to said cell if the RACH or traffic load exceeds a certain threshold.

2. A method according to claim 1, wherein the number of preamble sequence groups assigned to a cell is depending on a parameter representing anticipated RA or traffic load.

3. A method according to claim 1, wherein the number of preamble sequence groups assigned to a cell is depending on a dynamically changing parameter representing an instantaneous condition in the cell.

4. A method according to claim 3, wherein the dynamically changing parameter represents the instantaneous value of the normal user traffic load in the cell.

5. A method according to claim 4, wherein the instantaneous value of the normal user traffic load in the cell is estimated using an average of the normal user traffic load over a short time period in the near past.

6. A method according to claim 3, wherein the dynamically changing parameter represents the instantaneous RACH load in the cell.

7. A method according to claim 6, wherein the instantaneous RACH load in the cell is estimated using an average of the instantaneous RA load over short time period in the near past.

8. A method according to claim 6, wherein RA transmissions and/or number of RA collisions are measured in order to determine said dynamically changing parameter.

9. A method according to claim 1, wherein the number of assigned preamble sequence groups further depends on static properties of the cell such as cell layout, cell type and cell location.

10. A method according to claim 1, wherein the assignment of preamble sequence group(s) to the cell is made on the broadcast channel in said cell.

11. A method according to claim 1, wherein the assignment of preamble sequence group(s) that are available in the cell is communicated from the network node directly to a UE.

12. A method according to claim 1, wherein detection parameters used by the base station for detecting the RA transmissions are altered depending on the number of assigned preamble sequence groups.

13. A method according to claim 12, wherein when only one preamble sequence group is assigned to a cell, the detection threshold is low, whereas the detection threshold is increasing with the addition of one or more preamble sequence group(s).

14. A radio network node in a cellular telecommunication system, comprising:

means for arranging groups of preamble sequences where the sequences within each group are orthogonal to each other, while sequences belonging to different groups are not orthogonal to each other;

means for assigning one or more such groups to the cell that the radio network node is in control of; and means for receiving a load estimation input and for making a decision on assignment of one or more additional group(s) to the cell based on said input.

15. A radio network node according to claim 14, wherein said node is a radio base station.

* * * * *